INVENTOR
LESLIE E. SODERQUIST
BY Ely, Frye & Hamilton
ATTORNEYS

INVENTOR.
LESLIE E. SODERQUIST
BY Ely, Frye & Hamilton
ATTORNEYS

INVENTOR.
LESLIE E. SODERQUIST
BY Ely, Frye & Hamilton
ATTORNEYS

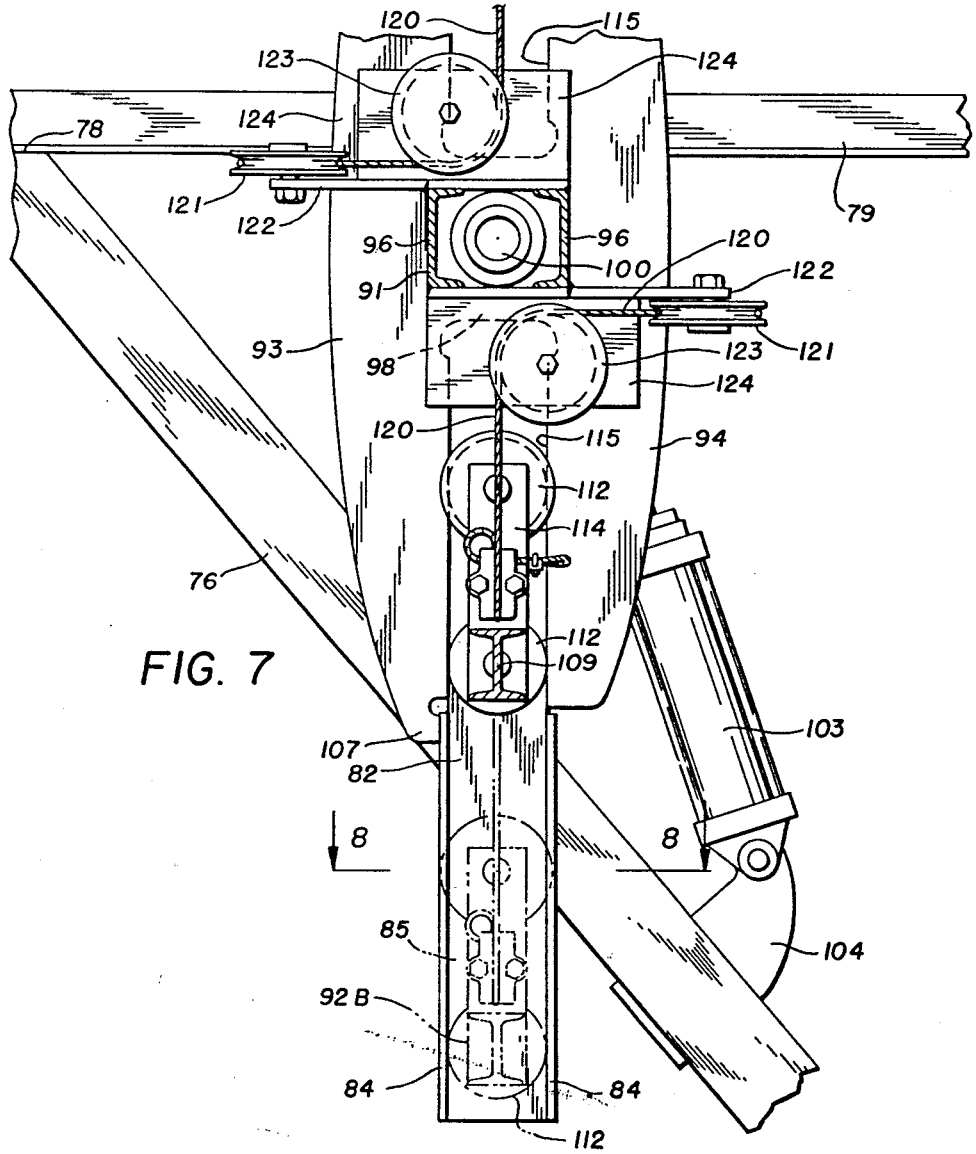
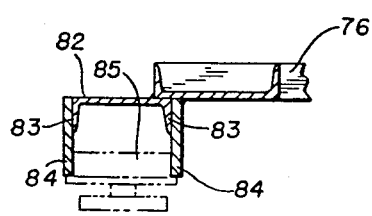

Jan. 29, 1963   L. E. SODERQUIST   3,075,237
APPARATUS FOR USE IN THE MANUFACTURE OF TIRES
Filed Aug. 19, 1960   8 Sheets-Sheet 7

INVENTOR.
LESLIE E. SODERQUIST
BY
ATTORNEYS

INVENTOR.
LESLIE E. SODERQUIST
ATTORNEYS

United States Patent Office 3,075,237
Patented Jan. 29, 1963

3,075,237
APPARATUS FOR USE IN THE MANUFACTURE OF TIRES
Leslie E. Soderquist, Silver Lake, Ohio, assignor to The McNeil Machine & Engineering Company, Akron, Ohio, a corporation of Ohio
Filed Aug. 19, 1960, Ser. No. 50,769
5 Claims. (Cl. 18—2)

The present invention relates to presses having separable mold sections for shaping and curing unvulcanized tire bands. More specifically, the invention relates to the holding and inflating of tires during a cooling period following vulcanization and to apparatus adapted for use in combination with a press for performing said treatment.

Apparatus for holding and inflating tires during a cooling period following inflation is disclosed and claimed in this inventor's two prior and copending applications, Serial No. 670,068, filed July 5, 1957, now U.S. Patent No. 2,978,741 and Serial No. 751,245, now U.S. Patent No. 2,963,737. In the prior applications, there is a disclosure of known art practices to inflate tires, the body plies of which are made from nylon cords or synthetic filaments having the property of shrinking during cooling, immediately after discharge from the press and holding them in inflated condition at adequate pressures until the tires have cooled down to a temperature where shrinkage of the nylon cords has ceased. The tires are usually vulcanized at temperatures in excess of 300° F. The hot tires should be inflated to at least 50 p.s.i. internal pressure until the temperature of the tire has been reduced to below 200° F., at which point the shrinkage of the nylon cords will no longer cause undesirable distortion of the cured tire. This procedure has been called in the art "post inflation."

A purpose of this invention is to provide concepts which enable the known art procedure of post inflation to be employed to additional advantage; specifically, to provide for both post inflation and "post cure" of an almost wholly vulcanized tire outside of the press. The inventor of this application has, through the concepts of his U.S. Patent No. 2,927,343, provided apparatus for the automatic loading of uncured tire bands into a press, reducing to the barest minimum the time period during which the press is open awaiting uncured tires. Through the concepts of his other U.S. patents, such as No. 2,832,991 and No. 2,832,992, the applicant has provided apparatus for the automatic unloading of cured tires from the press, also in a minimum time. The concepts of the present invention will further shorten the length of the curing cycle by reducing the time required for the press to be closed, by providing apparatus for holding and inflating an almost wholly vulcanized tire in such manner that the residual heat in the tire band upon discharge from the press molds, will continue or "post cure" the tire outside of the press molds while at the same time, additional tire bands are being cured in the press. The post cure and post inflation treatments which can be practiced by apparatus of this invention are applicable not only to nylon tires but also to tires having rayon, rayon-acetate, cotton or similar materials in the body plies.

Therefore, it is an object of the present invention to provide for the holding and inflating of tires during a cooling period following vulcanization so as to post cure and/or post inflate tires discharged from an immediately adjacent press.

The other and more specific objects and advantages of the invention will be apparent in view of the following detailed description and disclosure of one embodiment of the concepts of the invention.

In the drawings:

FIG. 7 is a partial section taken substantially as indicated on line 7—7 of FIG. 2;

FIG. 8 is a detail taken substantially as indicated on line 8—8 of FIG. 7;

Figure 1:
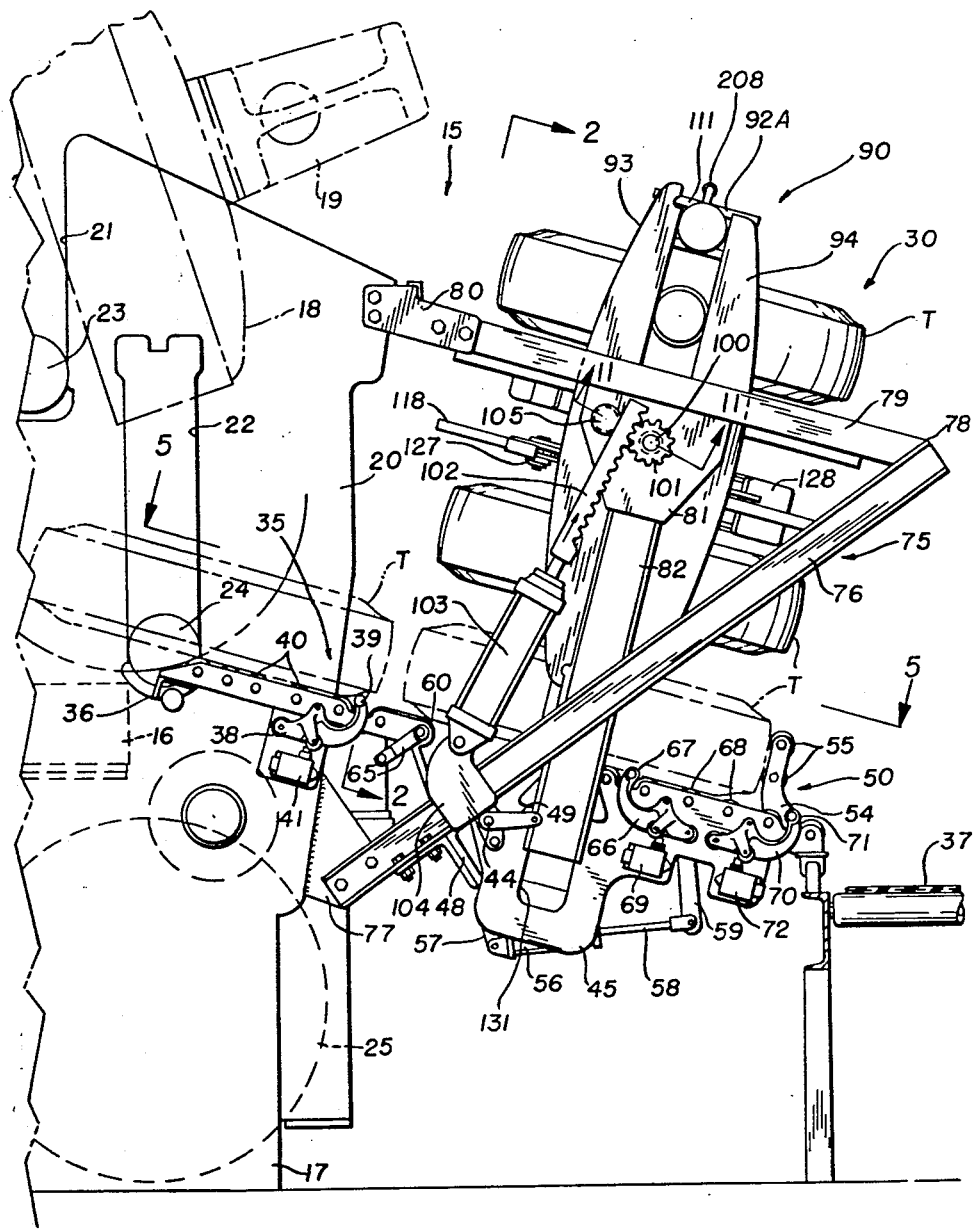
FIG. 1 is a right rear side elevation of a press according to the invention.
Figure 4:
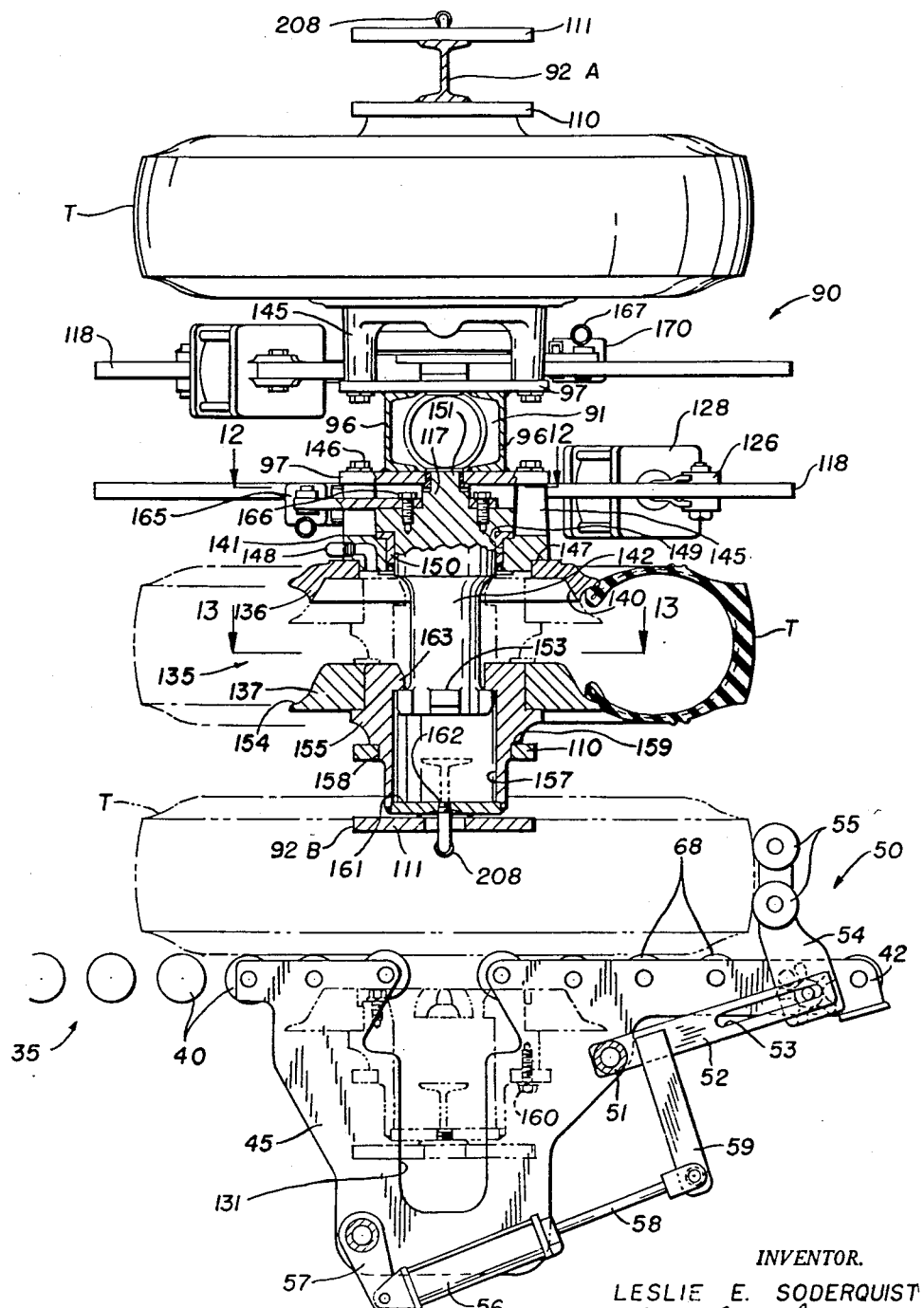
FIG. 4 is an enlarged cross section taken substantially as indicated on line 4—4 of FIG. 2.
Figure 11:
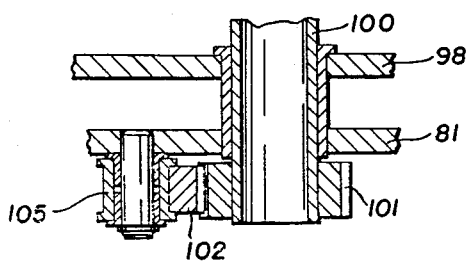
Figure 12:
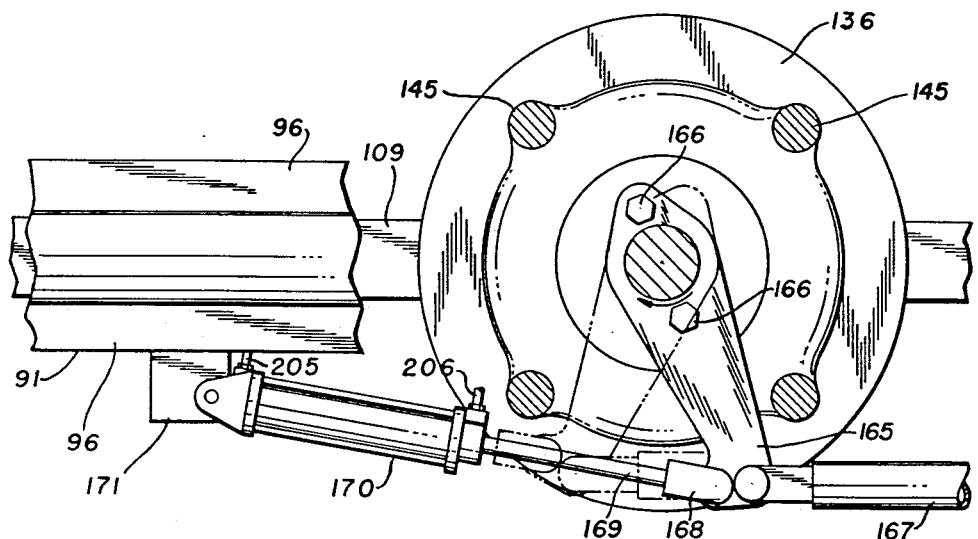
Figure 13:
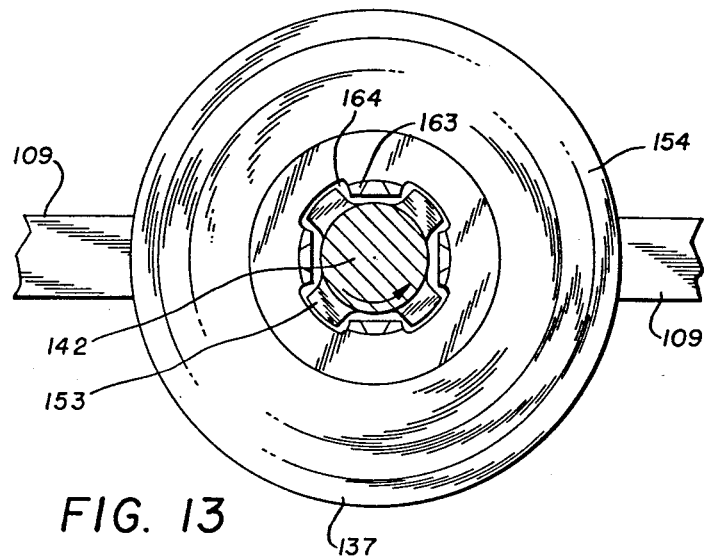

FIG. 11 is a detail taken substantially as indicated on line 11—11 of FIG. 1; and FIGS. 12 and 13 are details taken substantially as indicated on lines 12—12 and 13—13, respectively, of FIG. 4.

*General Description*

A tire curing press, indicated generally by the numeral 15 in FIG. 1, has a general construction and operating mechanism as shown in a number of prior art patents and applications of the inventor, including U.S. Patent No. 2,808,618 to which reference is made for such details as are required to more fully understand the invention. Referring to FIG. 1, the lower mold sections 16 are carried on a base 17. The upper mold sections 18 are supported from a crosshead 19. On opposite sides of the lower mold sections are side plates 20 extending upwardly from the base. Each side plate 20 has two parallel front and rear guideways 21 and 22. At each end of the crosshead 19 are guiding arms having front and rear rollers 23 and 24, receivable in the respective guideways 21 and 22. The crosshead 19 is pivoted to the upper end of a pair of operating links (not shown) on opposite sides of the press and outside the guide plates 20. The operating links are actuated by large motor driven bull gears 25 to raise the crosshead and open the press.

As shown, the mechanism for holding and inflating tires during a cooling period following vulcanization is indicated generally by the numeral 30 and is at the discharge side or rear of the press 15. The "hot tires" T are stripped from the press molds by suitable means (not shown) and discharged onto supports or conveyors which are preferably an integral part of the press 15 and mechanism 30.

In general, a mechanism 30 includes a support or conveyor adjacent each set of molds (a lower section 16 and an upper section 18) and extending toward the rear of the press 15. At the side of each conveyor is a stationary frame assembly. The frame assembly supports a generally rectangular trunnion carriage extending over the conveyors and carrying two pairs of opposed tire clamping closures for each set of molds. Each two pair of closures are located in a stacked relation, one pair on a side of the trunnion carriage. Each closure has a seat for a tire bead. Means are provided to selectively extend one side of the trunnion carriage so that the closure pairs on that side will be separated or moved apart to positions above and below the plane of the conveyor. Further means are provided on the conveyors to selectively position tires in register with the separated closure pairs. When the closure pairs are moved together by retraction of the previously extended carriage side, a tire in register therewith will be clamped and elevated above the conveyor. When tires are clamped between closure pairs, further means are provided to oscillate the trunnion carriage and invert the closure pairs.

Hot Tire Support

Aligned with each set of molds is a support or conveyor indicated generally at 35. Referring to FIG. 1, the front end of each conveyor 35 is suitably connected, as indicated at 36, to the press 15 inside of the side plates 20 and immediately adjacent a lower mold section 16. The conveyors are rearwardly inclined and may be mounted to deliver a cooled tire onto any suitable take-away conveyor such as indicated at 37.

Figure 5:
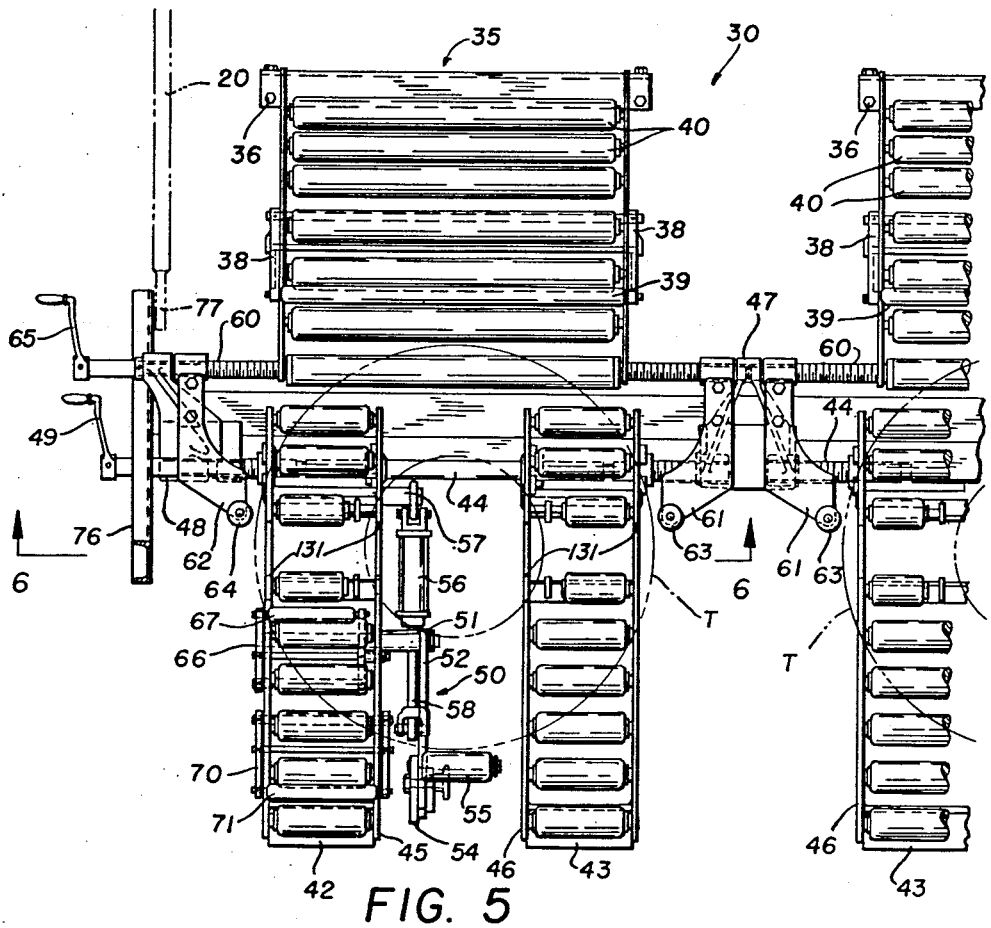
FIG. 5 is a partial plan section taken substantially as indicated on line 5—5 of FIG. 1.

Referring also to FIG. 5, the front portion of each conveyor 35 has a pair of pivoted clevis-like brackets 38 supporting a small diameter roller 39 slightly above the plane of the conveyor rollers 40. The outside bracket 38 is adapted to actuate a conventional electrical switch 41 to signal the discharge of a hot tire from the molds, as described below.

Figure 6:
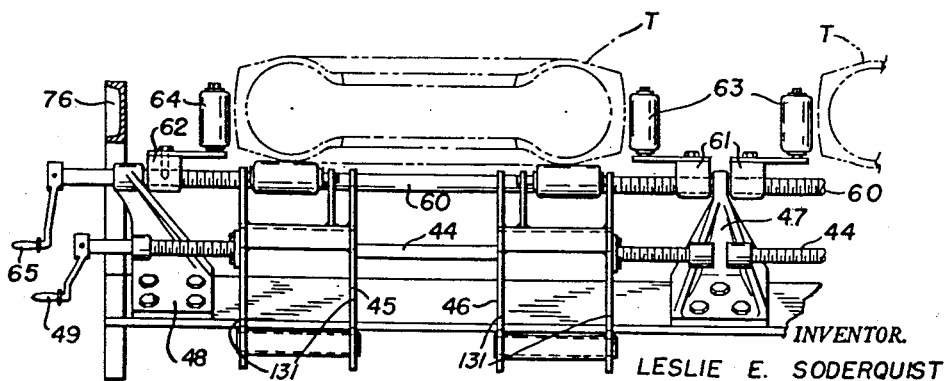
FIG. 6 is a section taken substantially as indicated on line 6—6 of FIG. 5.

Referring to FIGS. 5 and 6, the rear portion of each conveyor 35 has two small width conveyor sections 42 and 43, relatively adjustable laterally or in width to accommodate various size tires, by a jack screw 44 engaging undercarriage portions 45 and 46, respectively. The inner end of each conveyor jack screw 44 is journaled in an inboard bearing bracket 47. The outer end of each jack screw 44 is journaled in an outboard bearing bracket 48 and has an extension for a manual adjustment handle 49.

The outboard rear conveyor section 42 carries positioning means, indicated generally at 50, to selectively locate a hot tire in register with the closures described in detail below. As shown in FIGS. 4 and 5, the undercarriage 45 carries an inwardly extending pivot shaft 51 mounting the lower end of an upwardly directed lever arm 52. The upper end of the arm 52 is slotted as at 53, to adjustably mount a bracket 54 carrying stop rollers 55 to contact the tread surface of a tire on the conveyor 35.

The stop rollers 55 are selectively elevated from between the conveyor sections 42 and 43 to above the plane of the conveyor so as to position a tire longitudinally on the conveyors (FIG. 4), or lowered so as to complete the discharge of a cooled tire onto the take-away conveyor 37 by a pneumatic cylinder 56. The fixed end of cylinder 56 is attached by a bracket 57 to the inboard face of the conveyor undercarriage 45. The piston rod end 58 is pivotally connected to a link bar 59 which is rigidly connected at the upper end to the stop actuating arm 52.

As described, the stop rollers 55 will position a tire longitudinally on the conveyors 35. However, it is preferred to provide additional positioning means to locate a tire laterally on the conveyors. Referring to FIGS. 5 and 6, an upper jack screw 60 journaled in the inboard bracket 47 and the outboard bracket 48, above and forward the lower jack screw 44, carries brackets 61 and 62 mounting rollers 63 and 64, respectively, on vertical axes. The jack screws 60 are provided with an extension for a manual adjustment handle 65 to laterally position tires on the conveyors 35.

Referring to FIG. 5, the mid-portion of the outboard rear conveyor section 42 has a pair of pivoted clevis-like brackets 66, similar to brackets 38, supporting a small diameter roller 67 slightly above the plane of the conveyor rollers 68. The outside bracket 66 is adapted to actuate a conventional electrical switch 69 to signal the presence of a hot tire from the molds positioned by rollers 55, 63 and 64 in register with the closures, as described below. At the rear of conveyor section 42, another pair of brackets 70, similar to brackets 66, support signal roller 71 slightly above the plane of the conveyor rollers 68. The outside bracket 70 is adapted to actuate a conventional electrical switch 72 to signal the discharge of a cooled tire, when the stop rollers 55 are lowered, onto the take-away conveyor 37.

The Frame Assembly

At the outside of each conveyor 35 is a stationary member or frame assembly indicated generally at 75. Referring to FIG. 1, each frame 75 has an unwardly inclined beam 76 attached at its lower end to a bracket 77 on a press side plate 20. The upper end of each beam 76 is connected at 78 to the outer end of a channel 79. The inner end of each channel 79 is attached to a bracket 80 on the upper rear of each side plate 20. At the approximate midpoint of each channel 79 is a web bracket 81 for connection with the upper end of a C channel 82. The lower end of each channel 82 is attached to the inside of a beam 76.

Referring to FIGS. 7 and 8, the lower end of each channel 82 has welded to the flange portions 83 opposed plates 84. The plates 83 extend downwardly and below the beam 76 to provide an extension guide or channel 85 for the trunnion carriage as described below.

The Trunnion Carriage

Figure 2:
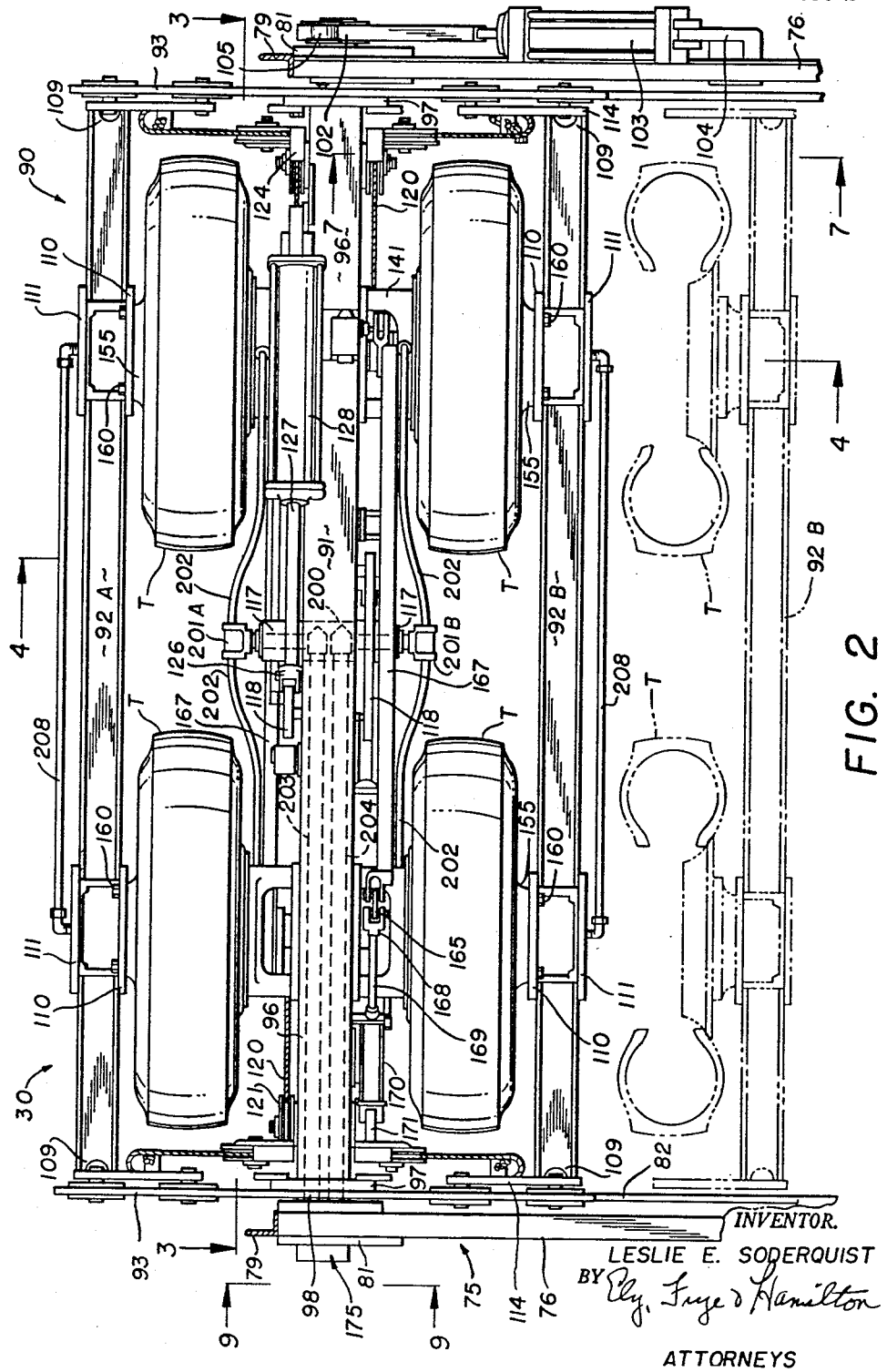
FIG. 2 is an elevation, taken substantially as indicated on line 2—2 of FIG. 1, looking to the rear of the press.

The trunnion carriage, indicated generally at 90, has a rectangular configuration and extends between the frames 75 across and over the conveyors 30. Referring to FIG. 2, the structural members of carriage 90 include a fixed horizontal center frame 91, identical movable horizontal lift frames 92A and 92B on either side of the center frame, and a pair of identical fixed vertical end frames, each end frame including a leading plate 93 and a trailing plate 94.

The main structural component of a center frame 91 preferably comprises a pair of opposed C channels 96 connected, as by welding, with opposed surface plates 97. At either end, the channels 96 and plates 97 are connected, as by welding, to the center of a web 98 connecting the plates 93 and 94 of the end frames. Outwardly of the plates 93 and 94, the ends of the center frame 91 have a pivot shaft 100 rotatably journaled in a suitable bushing in each frame web bracket 81. The outer end of one pivot shaft 100 (on the right rear side as shown in FIG. 1) carries a pinion gear 101 engaging the teeth of a rack 102 carried on the upper end of the piston rod of a double acting pneumatic cylinder 103 mounted on bracket 104 on a frame member 76. Referring to FIG. 11, the rack 102 is maintained in engagement with pinion 101 by a roller 105 extending outwardly from the frame bracket 81. Extension and retraction of the rack 102, in engagement with the gear 101, by suitable actuation of cylinder 103 will oscillate or invert the trunnion carriage 90 through an arc of approximately 180°.

As best seen in FIG. 7, the radially outer portion 107 of each leading plate 93 of an end frame projects beyond the upper ends of the side plates 84 of the extension guides 85. When the trunnion carriage 90 is inverted, the projections 107 provide a positive stop to align the lift frames 92A and 92B with the frame channels 82 and guides 85. When the carriage 90 is in the position shown in FIG. 7 (lift frame 92B being lowermost), the projections 107 will stop against the rear plates 84. When the carriage 90 is inverted (not shown), the projections 107 would stop against the front plates 84.

The main structural component of each lift frame 92 preferably comprises I beam lengths 109 having connected thereto, as by welding, opposed inner and outer surface plates 110 and 111. At either end of a beam 109, lift frames 92 have an assembly of two rollers 112 journaled on a track plate 114. The rollers 112 are selectively moved, toward and away from the center frame 91 in a slot 115 defined by the inner faces of the end frame plates 93 and 94 and center web 98.

Figure 3:
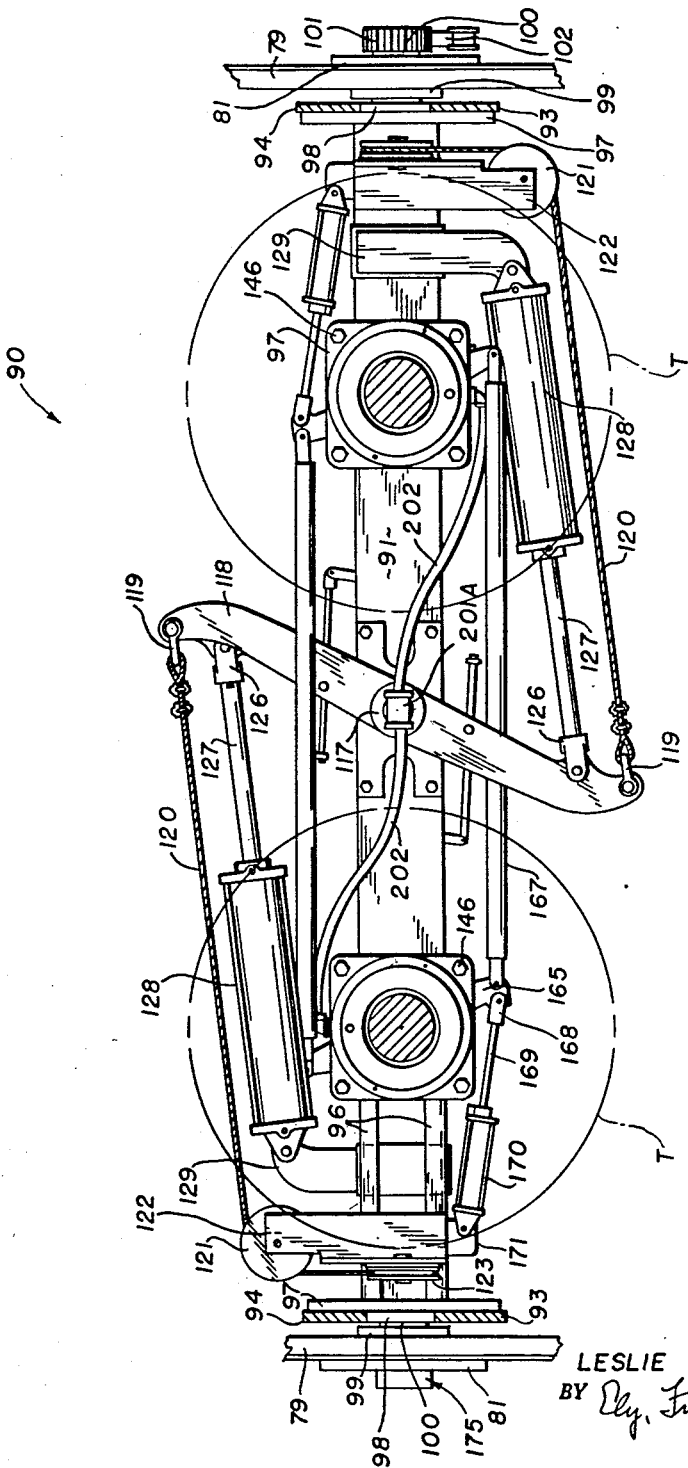
FIG. 3 is a plan section taken substantially as indicated on line 3—3 of FIG. 2.

The lift frames 92A and 92B are moved in the end frame slots 115 by an integral actuating mechanism carried on the center frame 91. Referring to FIGS. 2 and 3, on each surface plate 97 is a preferably centrally located pivot pin 117 movably mounting a double lever arm or swinglebar 118. At both ends of each swinglebar 118 is a shackle 119 for attachment of the inner end of actuating cables or chains 120. From the shackles 119, each cable 120 is trained around a pulley 121 carried on the end of a bracket 122 extending transversely of the channels 96 adjacent an end frame.

Referring to FIG. 7, from a pulley 121 each cable 120 is trained around a second pulley 123 carried by a bracket 124 also extending transversely of the channels 96. Each bracket 124 and pulley 123 is located so that the end of a cable 120 may be attached in a straight line to the track plate 114 at the end of each lift frame 92.

As best shown in FIG. 3, at opposite ends of each of the two swinglebars 118 is a clevis 126 for attachment of the piston rod 127 of a single-acting pneumatic cylinder 128. The base end of each cylinder 128 is carried on the end of a bracket 129 extending transversely the channels 96 adjacent a pulley bracket 122. In FIG. 3 (and FIG. 2), the cylinder rods 127 are extended and the swinglebars 118 are rotated to their fullest extent, clockwise as shown. Through the linkage including cables 120, the lift frame track plates 114 are at the inner end of each end frame slot 115. When the actuating fluid pressure to cylinders 128 is relieved, the swinglebars 118 will be free to rotate, counterclockwise as shown, slacking or relieving tension on the cables 120. De-energization of the cylinders 128 is controlled so that when the then lower lift frame (92B as shown) is properly aligned with the frame channels 82 and the lower extension guides 85, slacking of the cables 120 connected thereto will permit the lower lift frame to extend or drop by gravity to a position below the plane of the conveyors 35. This extended condition of the carriage 90 is shown in chain lines in FIGS. 2, 4 and 7.

Referring to FIG. 4, the medial section of each of the laterally adjustable conveyor under carriage portions 45 and 46 are provided with an upwardly opening slot 131 providing or defining a transverse passage below the plane of the support conveyor rollers to accommodate the lower lift frame 92, when extended.

The Closures

As shown, the trunnion carriage 90 carries four pair of closures, indicated generally at 135. Two pair of vertically aligned closures 135 are provided for each conveyor 35. Each closure pair preferably comprises a fixed or inner closure or disk 136 carried on the center frame 91 and a relatively movable or outer closure 137 carried on either the lift frame 92A or 92B.

Referring to FIG. 4, each inner closure 136 preferably comprises an outer element having an annular flange 140 suitably shaped to engage the bead area of a tire T in an airtight manner, an intermediate element 141 for mounting the closure 136 on the center frame 91, and an inner element 142 adapted to engage and lock with the opposed lower closure 137.

The inner portion of each closure mounting element 141 has four symmetrically spaced corner posts 145 adapted for attachment, as by bolts 146, to a center frame surface plate 97. The outer portion of an element 141 has a shoulder flange 147 for seating and attachment of the outer element 140. Extending through a side of each element 141 and opening interiorly of the bead engaging flange is a conduit 148 for the inflating and/or cooling medium, as described below. The center portion of an element 141 has a bore 149 to rotatingly receive a collar 150 on the center portion of each inner closure element 142.

The innermost portion of each closure locking element 142 has a reduced diameter end, indicated at 151, and is rotatably journaled in a center frame surface plate 97. The outer portion of each element 142 is adapted for locking engagement with the opposed outer closure 137 and preferably carries four symmetrically spaced radially projecting cams or lugs 153 (see FIG. 13).

Each outer closure 137 preferably comprises an outer element having an annular flange 154 suitably shaped to align and engage the bead area of a tire T in an airtight manner, and an inner element 155 for mounting the closure 137 on either the lift frme 92A or 92B and adapted for engagement and locking with the opposed inner closure 136. The extreme upper and lower positions possible for movement of an outer closure 137 in relation to an opposed inner closure 136 are shown by the chain lines in FIG. 4.

Each closure mounting element 155 is generally pedestal-shaped having a cylindrical interior bore 157. The medial portion of an element 155 is adapted for insertion in an opening 158 in a lift frame inner surface plate 110 and preferably has a positioning shoulder 159. Each element 155 is attached, as by bolts 160, inserted through plate 110 into the shoulder 159 (see FIG. 2).

The outer end of the mounting element bore 157 is closed by a plate 161. Extending through plate 161 is a conduit 162 for equalization of the pressure of the inflating and/or cooling medium between parallel closure pairs 135, as described below. The inner end of the mounting element bore 157 preferably has a collar 163 with four symmetrically spaced axially extending grooves 164 for accommodation of the lugs 153 of the opposed inner closure 136.

Each inner closure 136 is moved into locking engagement with the opposed outer closure 137 by an integral actuating mechanism carried on the center frame 91. The actuating mechanisms include a lever arm 165 attached, as by bolts 166, to the inner face of each collar 150 on an inner closure element 142. Referring to FIGS. 2 and 3, the projecting ends of lever arms 165 on parallel closure pairs 135 are connected by a link rod 167.

As best shown in FIG. 12, at opposite ends of center frame 91 one of each two linked pair of lever arms 165 has a clevis 168 for attachment of the piston rod 169 of a double-acting pneumatic cylinder 170. The base end of each cylinder 170 is carried on a bracket 171 mounted on the center frame 91 opposite of the pulley brackets 122. In FIG. 12 (and FIG. 4), a cylinder rod 169 has been extended and the lever arms 165 have been rotated counterclockwise, as shown. This rotation will move the lugs 153 of each inner closure 136 into locking engagement with the collar 163 of each outer closure 137. When a cylinder rod 169 is retracted by suitable actuation of a cylinder 170, the lever arms 165 rotate clockwise, to the chain line position of FIG. 12, unlocking the opposed closures 136 and 137 for separation.

Piping

The pressure fluid for actuation of the lift frame cylinders 128 and the closure lock cylinders 170, and the fluid inflating and/or cooling medium, originates remotely from the press and is conducted by suitable conduits (not shown) to a rotating valve, indicated generally at 175. The valve 175 is mounted opposite the carriage oscillation mechanism, including cylinder 103. The cylinder 103 and the conveyor stop cylinders 56 are preferably connected through suitable controls, as described below, directly to the source of fluid pressure and not through valve 175.

Figure 9:
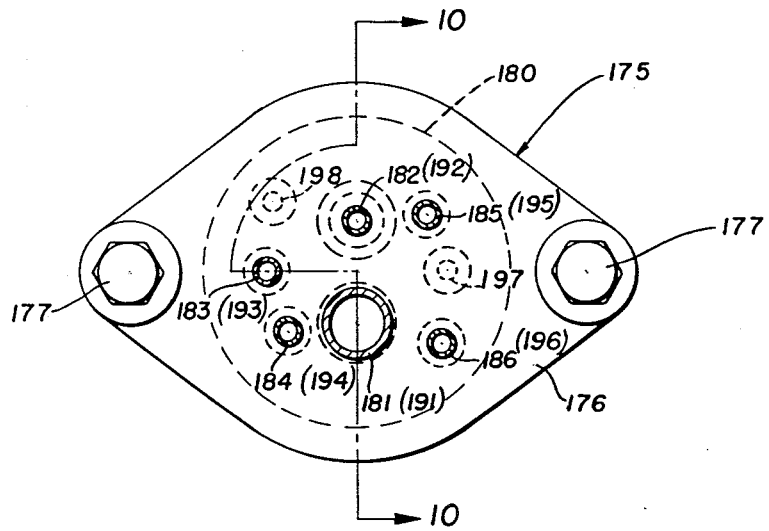
FIG. 9 is a view taken substantially as indicated on line 9—9 of FIG. 2.
Figure 10:
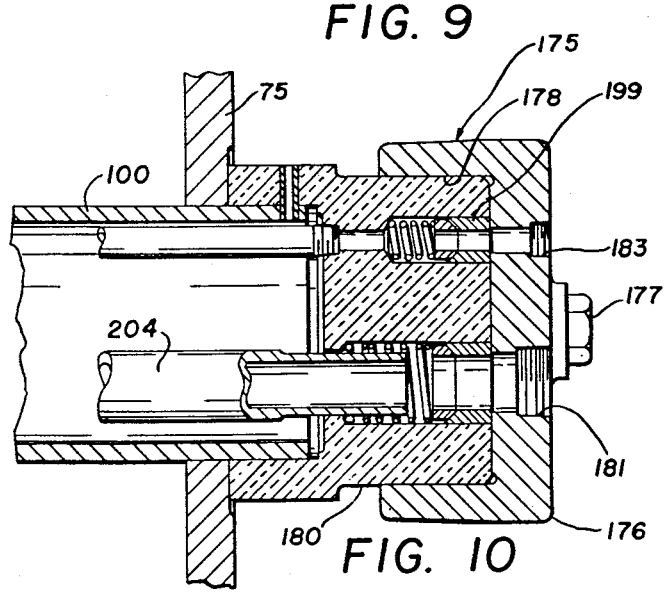
FIG. 10 is a section taken substantially as indicated on line 10—10 of FIG. 9.

Referring to FIGS. 9 and 10, the valve 175 includes a stationary end cap 176, attached as by bolts 177, to the frame assembly 75. The interior bore 178 of cap 176 is adapted to tightly, but rotatably, receive the outer portion of a valve member or receiver 180 securely attached to the outer end of carriage pivot shaft 100 or an extension thereof.

The outer portion of the end cap 176 has several fluid conduits extending therethrough. Conduit 181 has a large diameter opening and is adapted for communication with the remote source of tire inflating medium. Conduit 182 has a smaller diameter opening and is also adapted for communication with the inflating medium source. Conduit 183 is adapted for communication with the remote source of the pressure fluid through a controller (not shown) designated as C1. Conduits 184 and 185 are adapted for communication with the pressure fluid source through a common controller designated as C2. Conduit 186 is adapted for communication with the pressure fluid source through a controller designated as C3.

The receiver 180 of the valve has conduits therethrough (not all of which are shown) which may be selectively aligned, by oscillation of the carriage 90, with each of the valve cap conduits 181–186, just described. The receiver conduits are indicated at 191–196, respectively. In addition, the receiver has a conduit 197 located symmetrically opposite conduit 193 and a conduit 198 located symmetrically opposite conduit 196. Each of the conduits 191–198 is preferably provided with a conventional check valve assembly, such as indicated at 199 in FIG. 10.

At the inner end, each of the receiver conduits 191–198 is connected with piping extending through shaft 100 into the interior of the carriage 90 in the following manner:

*Tire inflation.*—Referring to FIG. 2, at the middle of center frame 91, between the pivot pins 117 for the swinglebars 118, is a manifold 200 (shown in chain lines). Within the manifold and through the pivot pins 117, are individual interior conduits opening into T fittings 201A and 201B. From each fitting 201, conduit piping 202 extends in opposite directions to the conduit 148 of each inner closure element. As shown, a length of rigid piping 203 extends from receiver conduit 192 to the upper interior conduit of manifold 200. A second length of rigid piping 204 extends from receiver conduit 191 to the lower interior conduit of manifold 200;

*Lift frames.*—A length of flexible piping (not shown) extends from each receiver conduit 193 and 197. Referring to FIG. 2, the piping from conduit 193 communicates with the pressure side of the single-acting lift frame cylinder 128 on the down side of the center frame 91. The piping from conduit 197 communicates with the pressure side of the cylinder 128 on the up side of the center frame; and

*Closure lock.*—A length of flexible piping extends from each receiver conduit 194, 195, 196 and 198. The piping from conduit 194 communicates with the base side of the double-acting closure lock cylinder 170 on the down side of center frame 91. The piping from conduit 195 communicates with the base side of cylinder 170 on the up side of the center frame. In FIG. 12, the piping from conduits 194 and 195 is indicated at 205. The piping from conduit 196 communicates with the free end of cylinder 170 on the down side of the center frame. The piping from conduit 198 communicates with the free end of cylinder 170 on the up side of the center frame. In FIG. 12, the piping from conduits 196 and 198 is indicated at 206.

When the closure pairs are clamping a tire and inflation pressure is being supplied through valve receiver conduits 191 or 192, it is preferred to provide means to fully seat a tire engaged between the flanges 140 and 154 of opposed inner and outer closures. A pressure equalization line 208, connected between conduits 162 (see FIG. 4) of parallel closure pairs 135, will balance the pressure interiorly of tires being inflated between opposed closures 136 and 137. This feature of pressure balancing is critical in the event the beads of a tire fail to seat properly on the surfaces 140 and 154, which would tend to separate the then lower lift frame (92B, as shown) away from the center frame 91. Should this condition occur, the pressure increase in the correctly seated tire will flow through conduit 208 to the interior of the incorrectly seated tire. This additional pressure flow will assure correct seating. It is desirable to provide a suitable cut-off valve (not shown) in line 208 in the event only one side of the apparatus 30 is being used.

*Operational Sequence and Control Mechanisms*

(1) In this description of the sequence of operations or steps and the control mechanisms for the holding and inflating of tires T during a cooling period following vulcanization, in apparatus as described above, it will be assumed that at the outset the press is closed, two tires are within the press undergoing vulcanization and four tires are clamped and inflated between the closure pairs 135. All of the press operations are controlled by a suitable master timer (not shown).

(2) Shortly before opening of the press, the timer will permit the bleeding of pressure fluid from valve conduit 181. Pressure reduction through conduit 191 will exhaust the inflating medium from the tires clamped between the down closure pairs 135. A suitable pressure switch (not shown) will signal the timer when the pressure has dropped to a safe level.

(3) After step (2), still before opening of the press, the timer will signal controller C3 to supply pressure fluid to valve conduit 186. Pressure passing through conduit 196 to the down cylinder 170 will unlock the closure pairs 135 on the then lower side of center frame 91.

(4) After step (3), but still before opening of the press, the timer will signal controller C1 to bleed pressure fluid from valve conduit 183. Pressure reduction through conduit 193 to the down cylinder 128 will separate the closure pairs, extend the down lift frame 92 below the plane of conveyors 35 and discharge a tire, carried on the outer closures 137 onto conveyors 35 and to the take-away conveyor 37.

(5) When the cooled tires are discharged onto conveyor 37, the switches 72 will signal the timer.

(6) When the timer has been signalled of step (5) and when the vulcanization period has expired, the press will open and discharge the two tires T. The description in this step is in accordance with other patents of this inventor, specifically referred to above and otherwise known to the art, and has therefore been greatly simplified.

(7) Concurrently with opening of the press in step (6), the timer will actuate cylinders 56 and elevate the stop rollers 55 above the conveyors 35.

(8) When the tires T are discharged onto conveyors 35, the switches 41 will signal the timer to load uncured tires into the press and commence another curing cycle.

(9) When the discharged tires are positioned on conveyors 35 by the positioning means 50, the switches 69 will signal the timer.

(10) When the timer has been signalled of step (9), the controller C1 will be signalled to supply pressure fluid to valve conduit 183. Pressure passing through conduit 193 to the down cylinder 128 will retract the extended lift frame to the top of frame slots 115 elevating tires T on outer closures 137 into contact with inner closures 136. A suitably located electrical switch (not shown), may be used to signal the timer of completion of this step.

(11) When step (10) is completed, the timer will signal controller C2 to supply additional pressure fluid to valve conduit 184. Pressure passing through conduit 194 to the down cylinder 170 will rotate the elements 142 of the inner closures into locking position with the outer closures 137. A suitably located electrical switch (not shown) may be used to signal the timer of completion of this step.

(12) After step (11), the timer will supply inflating medium to valve conduit 181. Pressure passing through conduit 191 to the inner closures 136 will inflate the tires T clamped between the locked closures. If either tire T fails to seat properly, the pressure equalization line 208 becomes effective. When the tires T are seated and inflated correctly, the closures 136 and 137 will move slightly apart to the normal locked position (see FIGS. 4 and 7). If desired, this closure separation may be signalled to the timer by a suitably located electrical switch (not shown).

It will be noted that during each of the preceding steps, inflating medium is being supplied to valve conduit 182 and pressure fluid to conduit 185. Through conduit 192, the inflating medium will maintain the tires clamped between the up closure pairs 135 in an inflated condition. Through conduit 195, the pressure fluid to the up cylinder 170 will maintain the up closure pairs 135 in a locked condition.

(13) During the cure commenced after step (8), and at a suitable time after step (12), the timer will actuate cylinder 103 and invert the carriage 90.

It will be noted that inversion of the carriage 90 rotates the valve receiver 180, through an arc of 180°. When this occurs, conduit 181 aligns with conduit 192, conduit 182 aligns with conduit 191, conduit 183 aligns with conduit 197, conduit 184 aligns with conduit 195, conduit 185 aligns with conduit 194 and conduit 186 aligns with conduit 198. Conduits 193 and 196, which had been aligned with conduits 183 and 186, are now closed by the inner face of the valve end cap 176.

After step (13), the press continues through the curing cycle until ready for repetition of step (2) and the succeeding steps. When operated in the sequence described, each tire is maintained in an inflated condition during two complete press curing cycles, less the time required for performance of steps (2) through (11).

While the foregoing description has been complete and detailed to enable the invention to be understood and practiced by those skilled in the art, adherence to exact details of construction is not necessary, and changes and modifications may be made without departing from the invention.

What is claimed is:

1. Apparatus for holding and inflating tires during a cooling period following vulcanization, comprising, a support for a tire, said support having an upwardly opening transverse passage, a stationary member adjacent said support, a trunnion carriage, said trunnion carriage having a center frame rotatably carried by said stationary member and movable frames on either side and parallel to said center frame, two closure pairs vertically aligned with said support one pair on each side of said carriage, each closure pair comprising opposed members having a seat to engage a tire bead, one member of each closure pair being mounted on said carriage center frame and the other said member being mounted on a carriage movable frame, means to selectively move one of said movable frames away from said center frame into said support passage so that the closure members thereon will be separated one below and one above the plane of said support, means to position a tire on said support in alignment with said separated closure members, means to inflate a tire clamped between said closure members above said support, and means to invert said carriage when said tire is inflated.

2. In a tire press for shaping and curing unvulcanized tires within separable mold sections, said press being adapted when open to discharge a hot tire, a conveyor adjacent a mold section to receive a discharged tire, said conveyor having an upwardly opening transverse passage, a stationary member adjacent said conveyor, a trunnion carriage, said trunnion carriage having a center frame rotatably carried by said stationary member and movable frames on either side and parallel to said center frame, two closure pairs vertically aligned with said conveyor one pair on each side of said carriage, each closure pair comprising opposed members having a seat to engage a tire bead, one member of each closure pair being mounted on said carriage center frame and the other said member being mounted on a carriage movable frame, means to selectively move one of said movable frames away from said center frame into said conveyor passage so that the closure members thereon will be separated one below and one above the plane of said conveyor, means to position a discharged tire on said conveyor in alignment with said separated closure members, means to inflate a tire clamped between said closure members above said conveyor, and means to invert said carriage when said tire is inflated.

3. Apparatus for holding and inflating tires during a cooling period following vulcanization, comprising, parallel supports for a tire, each support having an upwardly opening transverse passage, a stationary member at the outer side of each support, a generally rectangular trunnion carriage, said trunnion carriage having a center frame rotatably mounted between said stationary member, movable frames on either side and parallel to said center frame, and fixed frames at either end of said center frame guiding the ends of said movable frames, two closure pairs for each support located in stacked relation one pair on each side of said carriage, each closure pair comprising opposed members having a seat to engage a tire bead, one member of each closure pair being mounted on said carriage center frame and the other said member being mounted on a carriage movable frame, means to selectively move one of said movable frames away from said center frame into said support passages so that the closure members thereon will be separated one below and one above the plane of each support, means to position tires on said supports in alignment with said separated closure members, means to inflate tires clamped between said supports, and means to invert said carriage when said tires are inflated.

4. In apparatus for holding and inflating tires during a cooling period following vulcanization, said apparatus having at least two pairs of closures (135), each closure pair comprising a first disk (136) mounted on a fixed member (91) and an opposed second disk (137) mounted on a left member (92) selectively movable toward and away from said fixed member, each disk having an annular surface (140 or 154) to engage the bead area of a tire in an airtight manner and means (142 or 155) to engage and lock with the opposed disk, one of each said pair of disks having a conduit (162) for supplying inflation pressure interiorly of a tire positioned between said disks, pressure equalization means extending along said fixed member and connected between said conduits 162 to balance the inflation pressure interiorly of tires being inflated between said disks in the event the beads of a tire fail to seat properly on either of said annular surfaces (140, 154).

5. Apparatus according to claim 4 in which said pressure equalization means is a conduit line (208), having individual cut-off valve means to the conduits 162 in the event only one pair of closures is being used.

References Cited in the file of this patent
UNITED STATES PATENTS

| | | |
|---|---|---|
| 1,906,327 | Maynard | May 2, 1933 |
| 2,227,798 | Rihn et al. | Jan. 7, 1941 |
| 2,866,500 | George et al. | Dec. 30, 1958 |
| 2,948,921 | Laube et al. | Aug. 16, 1960 |
| 3,008,180 | Woodhall | Nov. 14, 1961 |

UNITED STATES PATENT OFFICE
CERTIFICATE OF CORRECTION

Patent No. 3,075,237 January 29, 1963

Leslie E. Soderquist

It is hereby certified that error appears in the above numbered patent requiring correction and that the said Letters Patent should read as corrected below.

Column 4, line 4, for "unwardly" read -- upwardly --; column 6, line 3, for "frme" read -- frame --.

Signed and sealed this 5th day of November 1963.

(SEAL)
Attest:
ERNEST W. SWIDER

EDWIN L. REYNOLDS

Attesting Officer

Acting Commissioner of Patents